United States Patent [19]

Burrafato et al.

[11] Patent Number: 4,913,863

[45] Date of Patent: Apr. 3, 1990

[54] SPLIT EXTRUSION DIE ASSEMBLY FOR THERMOPLASTIC MATERIALS AND METHODS OF USING THE SAME

[75] Inventors: John F. Burrafato, Wayne; Robert E. Hooper, Long Valley, both of N.J.

[73] Assignee: Hoechst Celanese Corporation, Somerville, N.J.

[21] Appl. No.: 303,215

[22] Filed: Jan. 30, 1989

[51] Int. Cl.$^4$ .................... B29C 47/88; B29C 47/92
[52] U.S. Cl. .................... 264/40.6; 264/177.17; 264/211.23; 264/237; 264/178 R; 425/71; 425/144; 425/325; 425/379.1; 425/461
[58] Field of Search ............ 264/40.6, 176.1, 177.17, 264/211.21, 211.23, 237, 178 R; 425/71, 144, 325, 379.1, 461

[56] References Cited

U.S. PATENT DOCUMENTS

| | | | |
|---|---|---|---|
| 2,402,281 | 10/1943 | Green | 264/177.1 |
| 2,443,053 | 6/1948 | Parmelee | 264/296 |
| 2,730,760 | 1/1956 | Bibby | 264/211.11 X |
| 3,194,868 | 7/1965 | Shaw | 425/144 X |
| 3,422,493 | 1/1969 | Heston | 425/144 X |
| 3,483,597 | 12/1969 | Windeler et al. | 425/144 X |
| 3,609,808 | 10/1971 | Jacobi et al. | 425/192 R |
| 3,640,659 | 2/1972 | Dimitroff | 425/463 X |
| 3,698,844 | 10/1972 | Grimm | 425/144 |
| 3,767,346 | 10/1973 | Mihalik | 425/461 X |
| 3,775,035 | 11/1973 | Scotto et al. | 425/144 X |
| 3,790,328 | 2/1974 | Maxwell | 425/381.2 |
| 3,804,574 | 4/1974 | Gatto | 425/325 X |
| 3,806,294 | 4/1974 | Hehl | 425/574 |
| 3,870,451 | 3/1975 | Gokcen | 425/378.1 |
| 3,981,653 | 9/1976 | Greenhalgh et al. | 425/113 |
| 4,038,018 | 7/1977 | Pepmeier | 425/505 |
| 4,332,543 | 6/1982 | Fulton et al. | 425/461 |
| 4,378,964 | 4/1983 | Wolfe, Jr. | 425/463 |
| 4,439,125 | 3/1984 | Dieckmann et al. | 425/140 |
| 4,465,454 | 8/1984 | Duerr et al. | 425/461 |
| 4,484,883 | 11/1984 | Honda et al. | 425/144 X |
| 4,504,210 | 3/1985 | Titz er al. | 425/461 |
| 4,564,350 | 1/1986 | Holmes et al. | 425/313 |
| 4,577,485 | 3/1986 | Moreiras | 72/402 |

FOREIGN PATENT DOCUMENTS 63-162216 7/1988 Japan ............ 264/177.17

*Primary Examiner*—Jeffery Thurlow
*Assistant Examiner*—Leo B. Tentoni
*Attorney, Agent, or Firm*—Nixon & Vanderhye

[57] ABSTRACT

A die spool for the extrusion of thermoplastic materials includes an axially split elongate spool body so as to be separable into first and second spool segments. The spool segments collectively establish the spool body and also define an axially oriented extrusion cavity through which thermoplastic material is conveyed. An alignment system ensures that only a single orientation of the extrusion axis is possible when the die spool is coupled to another similar die spool (or to an extrusion die associated with an extruder). A die spool assembly may therefore be provided which is comprised of a number of individual die spools. Preferably, a decreasing temperature gradient is established within the extrusion cavity of the die spool assembly (as may be accomplished by controllably operating electrical resistive heater elements) so as to at least partially solidify the thermoplastic extrudate therewithin. During extrusion start-up, a lower die spool segment is employed to support an initial length of thermoplastic extrudate, with the upper die spool segment being mated therewith (thereby collectively defining the extrusion cavity) once the extrudate extends beyond the downstream end of the lower segment. In such a manner, manual conveyance assistance along the extrusion axis may be imparted to the extrudate during start-up.

51 Claims, 1 Drawing Sheet

SPLIT EXTRUSION DIE ASSEMBLY FOR THERMOPLASTIC MATERIALS AND METHODS OF USING THE SAME

FIELD OF THE INVENTION

This invention broadly relates to the field of thermoplastic extrusion. In specific embodiments, the invention relates to "split body" die spools, assemblies of such die spools, and methods of using the same which find particular utility in the processing of low melt strength thermoplastic materials.

BACKGROUND AND SUMMARY OF THE INVENTION

The extrusion of thermoplastic materials as a means to produce a variety of end use products is a notoriously well known thermoplastic processing technique. Usually, thermoplastic stock in the form of pellets is introduced into a conventional screw extruder which thoroughly fluxes the thermoplastic in the extruder's barrel and discharges molten thermoplastic through an extrusion die. The extrusion die thus functions so as to shape the thermoplastic discharged from the screw extruder so as to achieve the desired product configuration (i.e., cross-sectional profile).

Difficulties may be encountered however during extrusion processing of products formed of low melt strength thermoplastics and/or when the products are intended to have rather complex cross-sectional profiles. One difficulty which may be encountered when low melt strength thermoplastics are extruded is the inability of such thermoplastics to be self-supporting when initially discharged from the extrusion die. This problem usually necessitates some additional support structure for the extrudate to allow it to cool (i.e., solidify) to an extent whereby it is then capable of supporting itself.

Other problems are attendant with the extrusion of low melt strength thermoplastics to form products having rather complex geometric profiles. Typically, extruded products having complex geometric profiles are produced using elongated extrusion dies which gradually shape the extrudate in an extrusion cavity defined between the die's inlet and outlet ends. That is, the extrusion cavity of these dies will usually have an inlet profile which roughly approximates the final cross-sectional profile of the product, and intermediate profiles which gradually transform this rough profile approximation into the final product profile by the time the extrudate exits the die.

While dies of the type mentioned immediately above do solve many of the problems associated with the extrusion of products formed of low melt strength thermoplastics having complex profiles, they typically cause difficulties during extruder start-up. That is, due to the increased axial length of these dies (necessitated by the gradual profile transformation of the extrudate within the die cavity), the operating pressure of the screw extruder may sometimes not be sufficient to force the extrudate through the die cavity. Obviously, manual assistance during start-up (as by physically pulling the extrudate through the die cavity from its outlet end) is not a solution since the terminal end of the extrudate is, during start-up, physically located within the die cavity and is therefore inaccessible.

What has been needed therefore, is a die assembly and/or method for extruding low melt strength thermoplastics to obtain products having relatively complex cross-sectional profiles. It is towards attaining solutions to the problems briefly mentioned above to which the present invention is directed.

According to the present invention, an assembly of elongate die spools is provided, each of which is formed of upper and lower die segments so as to be separable one from the other. Individual die spool cavities are therefore defined collectively by the upper and lower die segments of each die spool—i.e., one portion of the die cavity is defined by the lower die segment, with the other portion of the die cavity being defined by the upper die segment. A number of such individual die spools may be coupled together in an end-to-end fashion so that the individual die cavities of each communicate with one another and collectively establish an elongate die cavity for the die spool assembly along an extrusion axis. The die spool assembly (i.e., an assembly comprised of a number of individual die spools) may thus be mounted to a primary die associated with the screw extruder (or to the outlet of the screw extruder itself) so that the extrudate is transferred into and through the die cavity of the spool assembly along the extrusion axis.

The elongate die cavity of the die spool assembly may thus be configured so as to gradually shape the extrudate from a initial (rough approximation) cross-sectional profile to a final (or near final) cross-sectional profile for the product. That is, the upstream cavities of individual die spools in the assembly may provide an initial shaping of the extrudate, while the downstream cavities of individual die spools effect final (or near final) product shaping. Those cavities intermediate the upstream and downstream ones would therefore provide a gradual transition between the initial cross-sectional profile and the final (or near final) cross-sectional profile of the extrudate.

The "split body" die spools and their capability to be coupled to other similar die spools reduces (if not eliminates) many of the problems associated with extruder start-up. That is, during start-up, the lower die segment of an upstream-most one of the die spools may be coupled to a primary extrusion die associated with the screw extruder (or to the outlet of the screw extruder itself) so as to initially support the extrudate being discharged from the die (or extruder). When this length of extrudate approaches (or just begins to extend beyond) the downstream end of the lower die segment, a lower die segment of the next sequential die spool may then be mateably coupled to the downstream end of the lower die segment of the first die spool so as to support the continually increasing length of extrudate (i.e., due to its being continually advanced by means of the screw extruder and/or by means of manual pulling forces exerted upon the terminal end of the extrudate). Shortly thereafter, the upper die segment of the first die spool may be mated with its already positioned lower die segment (which is already supporting a length of the extrudate) so as to enclose the extrudate and thus force it through the die cavity collectively defined by the first die spool.

As will be appreciated, since the extrudate which extends beyond the downstream end of the first die spool is then being supported by the lower die segment of the next sequential die spool, its physical integrity is not compromised. Thus, the upper die segment of the next sequential die spool may then be mateably coupled to its lower die segment when the terminal end of the extrudate approaches (or extends just beyond) the downstream end of the lower die segment of the next sequential die spool. In such a manner, the next sequential die spool then defines another portion of the assembly's die cavity.

The technique referenced above may be repeated using additional die spools in sequence as may be necessary or desired for a given product. Hence, by employing the individual die spools in the manner briefly described, many of the problems associated with extruder start-up to produce products of complex cross-sectional profiles may be reduced (if not eliminated) since the extrudate may, at all times during start-up, be physically gripped and pulled along the extrusion axis to thereby assist in its conveyance along the extrusion axis.

The die spools of this invention are individually temperature-controlled, preferably by providing an electrical resistance type heating jacket (or any other equivalent temperature control means) around the die spool's body. Hence, as the extrudate is being advanced within the die spool cavities, the temperature of the extrudate at locations along the extrusion path (defined by the die spool cavities) may be controlled to facilitate start-up. And, during normal operating conditions, this temperature control ensures that the extrudate is shaped in the desired manner by the die spool cavities.

Further advantages and aspects of this invention will become more evident after considering the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE PREFERRED EXEMPLARY EMBODIMENTS

Figure 1:
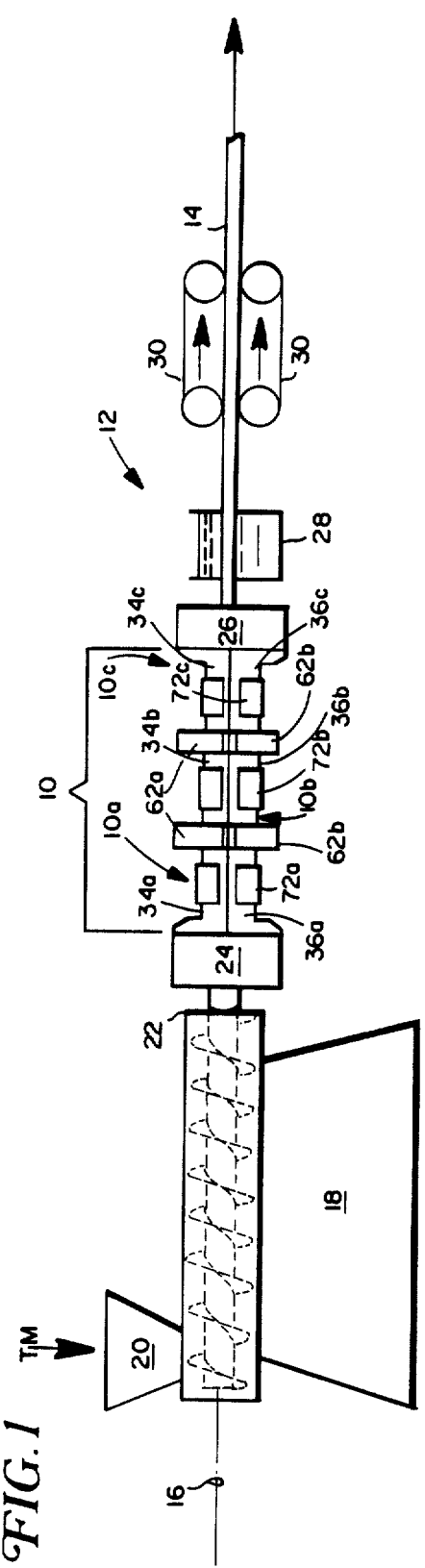
FIG. 1 is a schematic elevational view of the die assembly according to this invention employed in a thermoplastic extrusion line.

A die spool assembly 10 according to this invention is schematically shown in accompanying FIG. 1 as being a component part of an extrusion line 12 which forms an extruded product 14 along an extrusion axis 16. Upstream of die spool assembly 10 is a conventional screw extruder 18 which thoroughly fluxes thermoplastic material TM (usually in the form of pellets or granules) introduced into the extruder's hopper 20. As is well known, the extruder 18 discharges molten thermoplastic from its output end 22 to a primary extrusion die 24. According to the present invention, however, the use of a primary extrusion die 24 is not critical since the molten thermoplastic could immediately be transferred to the upstream end of the die spool assembly 10.

As will be explained in greater detail below, the die spool assembly 10 shapes the extrudate discharged from the primary die cavity so that, upon exiting a final shaping die 26, the product 14 will have attained its final (or nearly final) cross-sectional profile. The temperature of the extrudate will be controlled during its conveyance through the die spool assembly 10 (as will also be explained in greater detail below) so that a preselected temperature of the product 14 exiting the final shaping die 26 is achieved. Complete solidification of the product 14 may be accomplished downstream of the die spool assembly 10 by any convenient means. For example, as shown in FIG. 1, the product may be immediately passed through a cooling bath 28 which contains a suitable cooling medium (e.g., water) for the particular thermoplastic material being processed.

The extrusion line 12 may be provided with means which assist the product in its conveyance along the extrusion axis 16. In the extrusion line 12 depicted in the accompanying FIG. 1, such means may be in the form of opposing continuous belts 30 which frictionally grip the product 14 and thus serve to "pull" it through the die assembly 10. The speed of belts 30 is of course selected so that the cross-sectional profile of product 14 is not appreciably deformed.

The die spool assembly 10 according to this invention is composed of individual die spools 10a–10c. Although three die spools 10a–10c just happen to be shown in FIG. 1, it is of course possible to employ any single or multiple arrangement of die spools in dependance upon the final product, its cross-sectional profile, and/or the particular thermoplastic being extruded. Die spool 10b is shown in accompanying FIGS. 2 and 3 as being representative of die spools 10a and 10c. (It will be noted that die spools 10a and 10c are also partially visible in FIG. 2. Wherever possible, therefore, structure found in FIG. 2 for die spools 10a and 10c which corresponds to the structure to be discussed below with respect to die spool 10b, will be identified by a corresponding reference numeral with a letter postscript "a" and "c", respectively.)

The die spool 10b (10a, 10c) includes an elongate, generally cylindrical body 32b (32a, 32c) which is split along a longitudinal plane intercepting the extrusion axis 16 so as to provide upper and lower die segments 34b and 36b (34a and 36a; 34c and 36c), respectively. As is seen more clearly in FIG. 3, the upper and lower die segments 34b and 36b (34a and 36a; 34c and 36c) collectively define an elongate die spool cavity 38b (38a, 38c) having the desired cross-sectional profile for the product to be extruded therethrough. When the die spools 10a–10c are assembled in the manner shown in FIG. 1, their respective individual cavities 38a–38c will each define a respective portion of the overall die spool cavity through the assembly 10 between its inlet and outlet ends.

Figure 2:
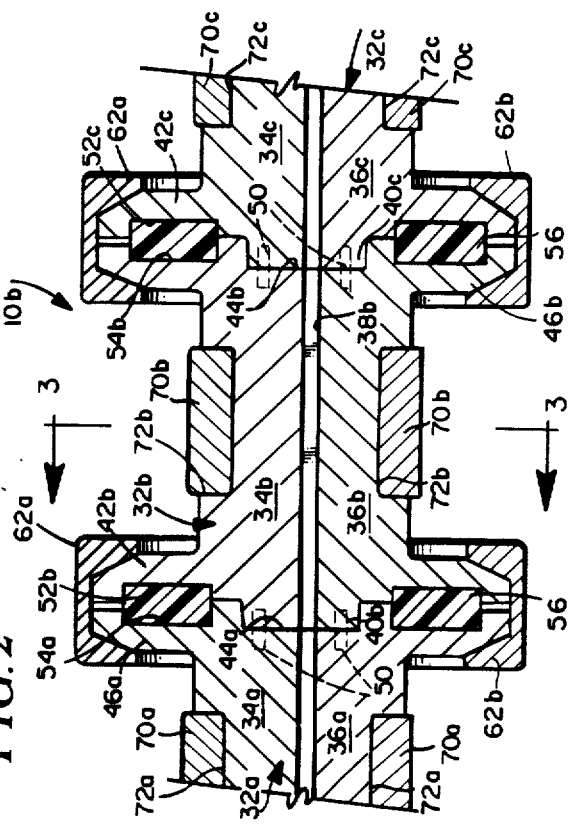
FIG. 2 is a cross-sectional side elevational view of a representative die spool according to this invention as taken along line 2—2 in FIG. 3.

The die spool 10b (10a, 10c) includes, at one of its ends, a generally cylindrical boss 40b (40c) forwardly of a vertical face established by mounting flange 42b (42c), and defines, at its opposite end, a generally cylindrical surface 44b (44a) recessed with respect to a vertical face established by its other mounting flange 46b (46a). As is seen in FIG. 2, the boss 40b is sized and configured to be mated within the recessed surface 44a of die spool 10a, while the boss 40c of die spool 10c is mated within the recessed surface 44b of die spool 10b to thereby achieve coaxial coupling (i.e., relative to the extrusion axis 16) of the die spools 10a–10c one to the other.

Figure 3:
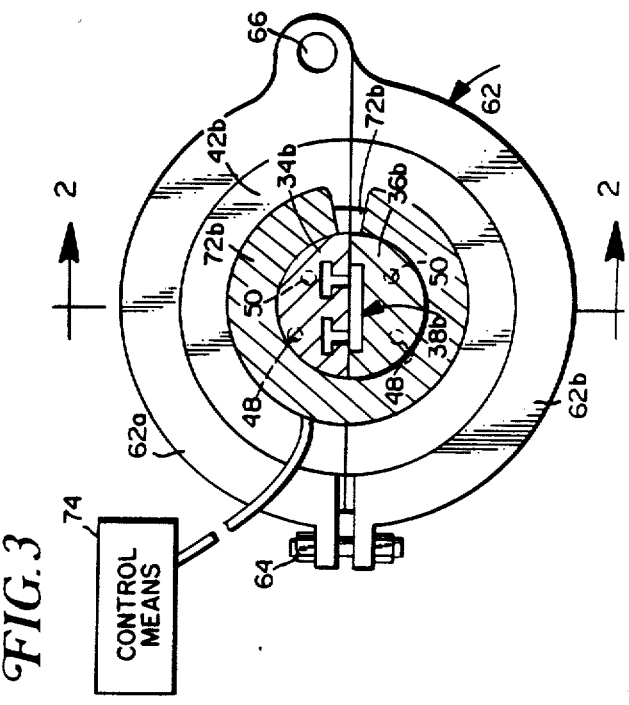
FIG. 3 is a cross-sectional end elevational view of the die spool depicted in FIG. 2 and taken along line 3—3 therein.

In order to ensure that the die cavity of one of the die spools 10a–10c is correctly oriented relative to the die cavities of the other of the die spools 10a–10c, the present invention utilizes an asymmetrical (i.e., relative to a vertical plane passing through the die spool body along the extrusion axis 16) orientation means comprised of (at least in the preferred embodiment) paired pin/apertures 48 and 50. As is seen in FIG. 3, the pin/aperture pair 48 are spaced apart a greater vertical dimension as compared to the vertical spacing between the pin/aperture pair 50. In such a manner, an asymmetrical arrangement of the pin/aperture pairs 48 and 50 ensues so that when adjacent ones of the die spools 10a-10c are coaxially mated, only a single (correct) orientation of the die spools is permitted.

The mounting flanges 42a-42c and 46a-46c each define an annular recessed surface 52a-52c and 54a-54c. When adjacent die spools 10a-10c are coaxially mated to one another, they may therefore be sealed against molten thermoplastic leakage by means of annular seals 56 positioned within one of the recessed surfaces 52a-54c and its respective recessed surface 54a-54c in confronting relationship thereto. The annular seals 56 also serve to thermally insulate to a significant extent the die spools 10a-10c one from the other. Thus, the thermal insulation provided by means of the seals 56 thereby allow more accurate temperature control to be exercised over individual ones of the die spools 10a-10c and thus facilitate the creation of the desired temperature profile defined by the die spool cavities.

The mounting flanges 42a-42c and 46a-46c also define an annular beveled edge 58a-58c and 60a-60c, respectively. As will be noted particularly from FIG. 2, the beveled edges 58a-58c will diverge from respective ones of the beveled edges 60a-60c when adjacent ones of the die spools 10a-10c are coupled to one another. These beveled edges engage within a flange clamp 62, and serve to draw the respective confronting mounting flanges 42a-42c and 46a-46c closer when the flange clamp is tightly secured (as may be accomplished via nut and bolt arrangement 64—see, FIG. 3). The clamp 62 is preferably of the type having a hinge pin 66 so that one portion 62a of the clamp 62 may be pivoted relative to the other portion 62b and thus allow greater ease when engaging and disengaging the clamp 62 with respective confronting pairs of mounting flanges 42a-42c and 46a-46c.

As was briefly mentioned above, the die spool assembly 10 preferably gradually cools the extrudate as it is conveyed through the die cavity. This function is preferably accomplished by positioning electrical resistance jackets 70a-70c within respective circumferential exterior recesses 72a-72c of the die spool bodies 32a-32c. A blanket of thermal insulation (not shown) may also be placed around the die spools 10a-10c between their respective mounting flanges 42a-42c and 46a-46c so as to cover the jackets 70a-70c. This thermal insulation, together with the seals 56, will thus serve to thermally insulate the die spools 10a-10c one from the other.

The jackets 72a-72c may thus be controlled individually (as is represented by the control means 74 in FIG. 3) so as to achieve a decreasing temperature gradient within the die spool cavity through which the extrudate is conveyed. In such a manner, the extrudate will at least be partially solidified when it exits the final extrusion die 26, with complete cooling and solidification thereof being accomplished via the bath 28, for example.

The jackets 72a-72c need not be of the electrical resistance type, but rather other equivalent heat exchange devices may be satisfactorily employed. Thus, the jackets 72a-72c may be embodied in heating or cooling jackets of the type in which a suitable heat-exchange fluid circulates. The control means 74 may therefore also be of any suitable type depending upon the means which embody the jackets 72a-72c. For example, when electrical resistance heaters are employed for jackets 72a-72c, the control means is most conveniently embodied in a rheostat type control element.

During start-up of the extruder line 12, the lower die segment 36a of die spool 10a will be coaxially coupled to the primary extrusion die 24 (or to the outlet end 22 of the extruder 18 if die 24 is not employed). Thermoplastic material TM may then be supplied to the extruder 18 so that a molten thermoplastic preform of the product 14 is discharged from the die 24. Continued operation of extruder 18 will therefore continually discharge more extrudate from die 24 thereby increasing the extrudate's length. However, the extrudate length will be supported by means of the lower die spool segment 36a.

Once the extrudate has increased in length so that it approaches (or just begins to extend beyond) the downstream end of segment 36a, upper segment 34a may then be mated with segment 36a so as to enclose the extrudate and hence establish an upstream-most portion of the die cavity for the assembly 10. At about the same time, the lower die spool segment 36b of die spool 36 is coupled to lower segment 36a of die spool 10a (e.g., as may be accomplished using clamp portion 62b) so as to then support the continually increasing length of the extrudate. Again, when the extrudate has reached the downstream end of lower segment 36b, the upper die segment 34b may then be mated therewith so as to establish the next sequential portion of the die cavity for the assembly 10. This technique may be repeated using lower and upper die segments 36c and 34c of die spool 10c, and any additional similar die spools which may be required for a given extrusion operation.

During the sequential coupling of the upper and lower die segments (34a-34c, and 36a-36c, respectively) in the manner described above, the clamp 62 may serve as a convenient means to postiionally hold the lower die spool segments 36a-36c one to the other before the respective upper die spool segments 34a-34c are mated therewith. Thus, the lower clamp portion 62b may be fitted onto the lower portion of the mounting flange pairs 42a-42c and 46a-46c established by respectvie mated pairs of lower die segments 36a-36c and thus hold these lower die segments in position. Thereafter, when the respective upper die segments (34a-36a) are mated therewith, the upper clamp portion 62a may be pivoted into clamping relationship (via pin 66) with the upper portions of mounting flange pairs 42a-42c and 46a-46c.

As will be appreciated, the present invention will afford, during start-up of the extrusion line 12, an opportunity to manually assist the extrudate's conveyance along the extrusion axis 16 since the terminal end of the extrudate is easily accessible. Hence, an operator may use suitable gripping tools to grip the extrudate during start-up and manually pull the same along the extrusion axis, while continually supporting the extrudate by means of the lower die segments 36a-36c.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A die spool for extrusion of thermoplastic materials comprising:
an axially elongate spool body including means which allow separation of said spool body into first and second spool segments mateable with one another along a longitudinal plane;
said first and second spool segments including means for collectively defining an extrusion cavity extending axially between opposing ends of said spool body;
said spool body including boss means at one of said ends, and means defining a recess at the other of said ends, said boss means and said recess defining means for respectively mateably engaging boss means and recess defining means of other die spools so as to form a die spool assembly comprised of a number of individual die spools; and
alignment means associated with said die spool for ensuring that said defined extrusion cavity is exactly aligned with respective extrusion cavities of said other die spools when said first mentioned die spool is mateably engaged therewith to form said die spool assembly.

2. A die spool as in claim 1, wherein said alignment means includes means, asymmetrically disposed relative to a predetermined longitudinal plane through said die spool, for establishing a single orientation of said first mentioned die spool relative to said other die spools, whereby exact alignment between said extrusion cavity of said first mentioned die spool and said respective extrusion cavities of said other die spools is ensured.

3. A die spool as in claim 2, wherein each of said boss means and said recess defining means includes said alignment means.

4. A die spool as in claim 2, wherein said orientation establishing means includes a plurality of apertures defined in said boss means and said recess defining means, and a corresponding number of pins receivable in said apertures of said first mentioned die spool and in said apertures of said other die spools when mateably engaged therewith.

5. A die spool as in claim 1, further comprising temperature control means in heat exchange relationship with said spool body for effecting temperature control of said extrusion cavity.

6. A die spool as in claim 5, wherein said temperature control means includes an electrical resistance heater means.

7. A die spool as in claim 1, further comprising a pair of mounting flanges each located at a respective said opposing end of said die spool and defining a substantially planar engagement face for mating with an engagement face of a mounting flange associated with other die spools.

8. A die spool as in claim 7, wherein said mounting flanges include means defining a beveled edge which, in cross-section, diverges downwardly away from said planar engagement face for cooperation with a clamping structure to assist in drawing said engagement face of said first mentioned die spool and said engagement face,;of a mounting flange of said other die spools into closely adjacent mated relationship.

9. A die spool as in claim 1, wherein said spool body defines a recessed surface which extends at least partially around an exterior circumference of said spool body, said die spool further including heater means disposed within said recessed surface in heat-exchange relationship with said die spool, whereby temperature control of the thermoplastic material within said extrusion cavity may be effected.

10. A die spool as in claim 9, wherein said heater means includes an electrical resistance heater.

11. A die spool assembly for extrusion of thermoplastic materials comprising plural die spools coaxially coupled to one another so as to define an extrusion axis, each said die spool including:
an elongate spool body including means which allow separation of said spool body into first and second spool segments mateable with one another along a longitudinal plane which intercepts said extrusion axis, said first and second spool segments thereby collectively establishing said spool body;
said first and second spool segments also collectively including means defining an extrusion cavity extending along said extrusion axis between opposing ends of said spool body;
said spool body including boss means at one of said ends, and means defining a recess at the other of said ends, said boss means and recess defining means for respectively mateably engaging said boss means and said recess defining means of another die spool in said assembly; and
alignment means for ensuring that said defined extrusion cavity of said die spool is exactly aligned with said extrusion cavity of said another die spool in said assembly mateably engaged therewith.

12. A die spool assembly as in claim 11, wherein said alignment means includes means, asymmetrically disposed relative to a predetermined longitudinal plane through said die spool, for establishing a single orientation of said first mentioned die spool relative to said another die spool, whereby exact alignment between said extrusion cavity of said first mentioned die spool and said respective extrusion cavity of said another die spool is ensured.

13. A die spool assembly as in claim 12, wherein said boss means and said recess defining means each includes said alignment means.

14. A die spool assembly as in claim 13, wherein said boss means and said recess defining means are each coaxially disposed relative to said extrusion axis.

15. A die spool assembly as in claim 12, wherein said alignment means includes a plurality of apertures defined in said boss means and said recess defining means, and a corresponding number of pins received in said apertures of said first mentioned die spool and in said apertures of said another die spool mateably engaged therewith.

16. A die spool assembly as in claim 11, wherein each said die spool further comprises a pair of mounting flanges each located at a respective said opposing end of said die spool and defining a substantially planar engagement face for mating with an engagement face of a mounting flange associated with said another die spool.

17. A die spool assembly as in claim 16, wherein said mounting flanges include means defining a beveled edge which, in cross-section, diverges downwardly away from said planar engagement face, and wherein said assembly further comprises clamping means defining surfaces which cooperate with said beveled edge of said first mentioned die spool and with a beveled edge of said another die spool to assist in drawing said engagement faces of said first mentioned and another die spools into closely adjacent mated relationship with one another.

18. A die spool assembly as in claim 11, wherein preselected ones of said die spools include a recessed surface which extends at least partially around an exterior circumference of said spool body, said preselected ones of said die spools further including heater means disposed within said recessed surface in heat-exchange relationship with said die spool, whereby temperature control of the thermoplastic material, within said extrusion cavity may be effected along said extrusion axis.

19. A die spool assembly as in claim 18, wherein said heater means includes an electrical resistance heater.

20. A thermoplastic extrusion apparatus comprising, in combination:
   extruder means for fluxing a thermoplastic material and for discharging molten thermoplastic extrudate through a discharge end thereof; and
   a die spool assembly having an inlet end coupled to said discharge end for receiving said thermoplastic extrudate from said extruder means, and an outlet end opposite to said inlet end thereof, said die spool assembly between said inlet and outlet ends establishing an extrusion cavity oriented along an extrusion axis;
   said die spool assembly including a plurality of die spools coupled one to another coaxially relative to said extrusion axis, wherein each said die spool of said die spool assembly comprises an elongate spool body including means which allow separation of said spool body into first and second spool segments which are mateable with one another along a longitudinal plane which intercepts said extrusion axis, said first and second spool segments thereby collectively establishing said spool body; and wherein,
   said die spool assembly further comprises temperature control means in heat exchange relationship with at least preselected ones of said die spools for establishing a decreasing temperature gradient between said inlet and discharge ends thereof within said extrusion cavity of said die spool assembly through which said thermoplastic extrudate is conveyed, thereby to at least partially solidify said thermoplastic extrudate upon its being discharged from said outlet end of said die spool assembly.

21. A thermoplastic extrusion apparatus as in claim 20, wherein said first and second spool segments also collectively include means defining a portion of said extrusion cavity extending along said extrusion axis between opposing ends of said spool body.

22. A thermoplastic extrusion apparatus as in claim 20, wherein said spool body includes boss means at one of said ends, and means defining a recess at the other of said ends, said boss means and recess defining means for respectively mateably engaging said boss means and said recess defining means of another die spool in said assembly.

23. A thermoplastic extrusion apparatus as in claim 22, wherein each said die spool further comprises alignment means for ensuring that said defined extrusion cavity portion is exactly aligned with said extrusion cavity portion of said another die spool in said assembly which is mateably engaged therewith.

24. A thermoplastic extrusion apparatus as in claim 23, wherein said alignment means includes means, asymmetrically disposed relative to a predetermined longitudinal plane through said die spool, for establishing a single orientation of said first mentioned die spool relative to said another die spool, whereby exact alignment between said extrusion cavity of said first mentioned die spool and said respective extrusion cavities of said another die spool is ensured.

25. A thermoplastic extrusion apparatus as in claim 24, wherein said boss means and said recess defining means each includes said alignment means.

26. A thermoplastic extrusion apparatus as in claim 25, wherein said boss means and said recess defining means are each coaxially disposed relative to said extrusion axis.

27. A thermoplastic extrusion apparatus as in claim 24, wherein said alignment means includes a plurality of apertures defined in one end of said spool body, and a corresponding number of pins received in said apertures, said pins being mateably engaged with said apertures of said another die spool.

28. A thermoplastic extrusion apparatus as in claim 20, wherein each said die spool further comprises a pair of mounting flanges each located at a respective said opposing end of said die spool and defining a substantially planar engagement face for mating with an engagement face of a mounting flange associated with said another die spool.

29. A thermoplastic extrusion apparatus as in claim 28, wherein said mounting flanges include means defining a beveled edge which, in cross-section, diverges downwardly away from said planar engagement face, and wherein said assembly further comprises clamping means defining surfaces which cooperate with said beveled edge of said first mentioned die spool and with a beveled edge of said another die spool to assist in drawing said engagement faces of said first mentioned and another die spools into closely adjacent mated relationship with one another.

30. A thermoplastic extrusion apparatus as in claim 20, wherein said temperature control means is comprised by preselected ones of said die spools including a recessed surface which extends at least partially around an exterior circumference of said spool body, said preselected ones of said die spools further including heater means disposed within said recessed surface in heat-exchange relationship with said die spool, whereby temperature control of the thermoplastic material within said extrusion cavity may be effected along said extrusion axis.

31. A thermoplastic extrusion apparatus as in claim 30, wherein said heater means includes an electrical resistance heater.

32. A thermoplastic extrusion apparatus as in claim 20, further comprising means downstream of said outlet end of said die spool assembly for cooling, and thus solidifying, said extrudate.

33. A thermoplastic extrusion apparatus as in claim 32, further comprising means, downstream of said cooling and solidifying means for frictionally engaging said solidified extrudate and conveying the same along said extrusion axis and to thereby assist in the conveyance of said thermoplastic extrudate through said extrusion cavity of said die spool assembly.

34. A method of forming extruded thermoplastic products comprising the steps of:
   (a) extruding a molten thermoplastic material through an extrusion die so as to form a product preform having a preselected cross-sectional geometry;

(b) supporting a length of said product preform on a portion of an extrusion cavity defined by a lower segment of a die spool by coupling said lower die spool segment to said extrusion die;

(c) positioning a remaining portion of said extrusion cavity defined by an upper segment of said die spool in mated relationship with said first mentioned portion of said lower die spool segment, by bringing said upper and lower die spool segments into mated relationship with one another while said product preform length is being supported by said lower spool segment; and then (d) effecting temperature control of said product preform within said extrusion cavity collectively established by said mated upper and lower die spool segments by controlling temperature within said extrusion cavity through which said product preform is conveyed, wherein step (a) is practiced continually so as to allow said length of product preform to increase by being conveyed beyond a downstream end of said die spool, and wherein the method further comprises the steps of;

(e) supporting said increased length of said product preform on a portion of an extrusion cavity defined by a lower segment of a second die spool by coupling said second lower die spool segment to said first mentioned lower die spool segment; and then (f) positioning a remaining portion of said extrusion cavity defined by an upper segment of said second die spool in mated relationship with said extrusion cavity portion of said second lower die spool segment, by bringing said second upper and lower die spool segments into mated relationship with one another.

35. A method as in claim 34, wherein step (d) is practiced by establishing a decreasing temperature gradient within said extrusion cavities of said first and second die spools.

36. A method as in claim 35, wherein step (d) is practiced by effecting heat exchange relationship between the die spool and a temperature control system.

37. A method as in claim 36, wherein step (d) is practiced by operating electrical resistive heater means associated with at least one of said first and second die spools in heat exchange relationship with the die spool.

38. A method as in claim 34, further comprising the step of solidifying said product preform discharged from said die spool.

39. A method as in claim 38, wherein said step of solidifying said product preform is practiced by passing the same through a cooling fluid bath.

40. A method as in claim 39, further comprising the step of pulling said cooled and solidified product through said bath to thereby assist in the conveyance of said product preform through said extrusion cavity.

41. A die spool assembly for extrusion of thermoplastic material along a predetermined extrusion axis and adapted to being coupled operatively to a discharge end of an extruder, said die spool assembly comprising a number of die spools coaxially coupled end-to-end along said extrusion axis, wherein each said die spool includes:

an elongate die spool body including means which allow separation of said spool body into first and second spool segments mateable with one another along said extrusion axis;

said first and second die segments collectively including means defining an extrusion cavity for shaping said thermoplastic material; and coupling means associated with said spool body for mateably coupling said die spool end-to-end along said extrusion axis with another said die spool in said assembly.

42. A die spool assembly as in claim 42, wherein said coupling means includes;

boss means at one end of said die spool; and means defining a recess at an opposite end of said die spool;

said boss means and said recess defining means for respectively mateably engaging said boss means and said recess defining means of said another die spool in said assembly mateably coupled therewith.

43. A die spool assembly as in claim 42, further comprising alignment means for ensuring that said defined extrusion cavity of said die spool is properly aligned with said extrusion cavity of said another die spool in said assembly mateably coupled therewith.

44. A die spool assembly as in claim 43, wherein said alignment means includes means, asymmetrically disposed relative to a predetermined longitudinal plane through said die spool, for establishing a single orientation of said first mentioned die spool relative to said another die spool, whereby proper alignment of said extrusion cavity of said first mentioned die spool and said extrusion cavity of said another die spool is ensured.

45. A die spool assembly as in claim 42 or 43, wherein said die spool further comprises a pair of mounting flanges each located at a respective end of said die spool and defining a substantially planar engagement face for mating with an engagement face of a mounting flange associated with said another die spool.

46. A die spool assembly as in claim 42, wherein at least one of said number of die spools includes temperature control means for effecting temperature control within said extrusion cavity thereof.

47. A die spool assembly as in claim 46, wherein said temperature control means includes an electrical resistance heater.

48. A method of forming extruded thermoplastic products comprising the steps of:

(a) extruding a molten thermoplastic material through an extrusion die so as to form a produce preform having a preselected cross-sectional geometry;

(b) supporting a length of said product preform on a portion of an extrusion cavity defined by a lower segment of a die spool by coupling said lower die spool segment to said extrusion die;

(c) positioning a remaining portion of said extrusion cavity defined by an upper segment of said die spool in mated relationship with said first mentioned portion of said lower die spool segment, by bringing said upper and lower die spool segments into mated relationship with one another while said product preform length is being supported by said lower spool segment, wherein step (a) is practiced continually so as to allow said length of product preform to increase by being conveyed beyond a downstream end of said die spool, and wherein the method further comprises the steps of;

(e) supporting said increased length of said product preform on a portion of an extrusion cavity defined by said portion of an extrusion cavity defined by a lower segment of a second die spool by coupling said second lower die spool segment to said first mentioned lower die spool segment; and then (f) positioning a remaining portion of said extrusion cavity defined by an upper segment of said second die spool in mated relationship with said extrusion cavity portion of said second lower die spool segment, by bringing said second upper and lower die spool segments into mated relationship with one another.

49. A method as in claim 48, further comprising the step solidifying said product preform discharged from said die spool.

50. A method as in claim 49, wherein said step of solidifying said product preform is practiced by passing the same through a cooling fluid bath.

51. A method as in claim 50, further comprising the step of pulling said cooling and solidified product through said cooling fluid bath.

* * * * *

UNITED STATES PATENT AND TRADEMARK OFFICE
CERTIFICATE OF CORRECTION

PATENT NO. : 4,913,863

DATED : April 3, 1990

INVENTOR(S) : BURRAFATO et al

It is certified that error appears in the above-identified patent and that said Letters Patent is hereby corrected as shown below:

Column 2, line 27, change "a" to --an--.

Column 6, line 41, change "postiionally" to --positionally--.

Column 7, line 64, change "face,;of" to --face of--.

Signed and Sealed this

Twenty-third Day of July, 1991

Attest:

HARRY F. MANBECK, JR.

*Attesting Officer*     *Commissioner of Patents and Trademarks*